United States Patent [19]

Roha

[11] Patent Number: 5,241,020
[45] Date of Patent: Aug. 31, 1993

[54] POLYMERIC BLENDS PREPARED WITH REACTIVE INITIATORS

[76] Inventor: Max Roha, 8205 Parkview Rd., Brecksville, Ohio 44141

[21] Appl. No.: 602,058

[22] Filed: Oct. 22, 1990

Related U.S. Application Data

[63] Continuation of Ser. No. 352,509, May 16, 1989, abandoned.

[51] Int. Cl.$^5$ .................................. C08F 283/04
[52] U.S. Cl. ............................ 525/455; 525/131; 525/529; 525/530; 525/930
[58] Field of Search ............... 525/131, 903, 455, 529, 525/530

[56] References Cited

U.S. PATENT DOCUMENTS

| | | | |
|---|---|---|---|
| 3,909,497 | 9/1975 | Hendry | 260/77.5 A |
| 4,094,868 | 6/1978 | Chandalia et al. | 534/886 |
| 4,095,019 | 6/1978 | Markiewitz et al. | 526/215 |
| 4,256,636 | 3/1981 | Roos et al. | 534/838 |
| 4,363,896 | 12/1982 | Chattha | 525/110 |
| 4,379,886 | 4/1983 | McLaughlin | 525/162 |
| 4,524,201 | 6/1985 | Barnabeo et al. | 528/395 |
| 4,540,760 | 9/1985 | Harada et al. | 526/211 |
| 4,569,979 | 2/1986 | Harada et al. | 526/218.1 |
| 4,584,356 | 4/1986 | Crivello | 525/479 |
| 4,746,715 | 5/1988 | Dworczak et al. | 526/211 |
| 5,039,734 | 8/1991 | Kinoshita et al. | 524/715 |

OTHER PUBLICATIONS

CA:105(14): 115547n (Wako Pure Chemical Industries, Ltd).
Chemical Abstracts 96:1025217m, "Interpolymers of Polyurethanes and Addition Polymerizable Monomers", U.S. Pat. No. 4,312,972.
"Composites formed by Interstital Polymerization of Vinyl Monomers in Polyurethane Elastomers 1. Preparation and Mechanical Properties of Methyl Methacryalate Based Composites".
"Polyurethane Interpenetrating Polymer Networks. I. Synthesis and Morphology of Polyurethane-Poly(methyl methacrylate) Interpenetrating Polymer Networks".

*Primary Examiner*—Ana L. Carrillo

[57] ABSTRACT

Novel blends of polymers are produced by polymerizing interreactive compounds that form polymers in a non-free radical polymerization, and at least one monomer possessing carbon-to-carbon double bonds capable of polymerization by means of a free radical mechanism, in the presence of reactive initiators. In a preferred mode, a reaction mixture is formed comprising the interactive compounds, the monomers, and the reactive initiators. The interactive compounds are reacted in a initial step to form a first polymer connected to the reactive initiator. In a subsequent reaction, free radicals derived from the reactive initiator promote polymerization of the monomers to form a second polymer. The first polymer forms the continuous phase of the blend, while the second polymer comprises the discontinuous phase. As a consequence of the enhanced inter-phase adhesion resulting from the interaction of the reactive initiators with both polymers, the blends display superior tensile strengths, elastic recovery, and increased elongation at break.

4 Claims, 4 Drawing Sheets

POLYMERIC BLENDS PREPARED WITH REACTIVE INITIATORS

This is a continuation of co-pending U.S. application Ser. No. 352,509 filed on May 16, 1989 now abandoned.

TECHNICAL FIELD

This invention relates to polymer blends that display superior physical properties. More particularly, this invention relates to polymer blends synthesized with reactive initiators. Specifically, this invention relates to the preparation of blends of polymeric materials, one being present in a continuous phase, the other in a discontinuous phase. The reactive initiators used in their preparation result in the formation of a linking bond between the polymeric materials that causes superior interphase adhesion, the latter producing superior physical characteristics.

BACKGROUND OF THE INVENTION

It has long been recognized that the physical properties that make certain polymers desirable for particular applications are unsuitable for other applications requiring specifically different physical properties. This has led to attempts to prepare polymeric materials possessing characteristics that would make them suitable in specific applications for which satisfactory polymers have hitherto been unavailable. One approach to achieve such products involves the preparation of "customized" polymers whose physical properties match the properties needed in the applications for which the polymers are required. Such preparations are not always technically possible, however, and even in those instances where suitable new polymers are discovered, it is often found that their necessary raw materials, or their process of synthesis, or both, involve manufacturing costs of such magnitude as to make the production of the polymers impractical from a commercial point of view.

A different approach commonly resorted to has been to identify the physical properties required of polymers suitable for the applications identified, and then to prepare physical blends of different polymers, each having individual characteristics that respond to a particular need required of the products, the aggregate of the characteristics defining the physical properties necessary for the application.

While the latter approach has met with much success, there have also been drawbacks to the preparation of polymeric blends whose individual components exhibit one or more of the properties sought for a particular application.

One problem, for example, has been the inability of the mixed polymer blends to establish the degree of physical integration of the polymers necessary to assure that each is able to contribute the different physical properties unique to itself, the combination of which is needed to meet the requirements of a particular application, requiring a specific group of physical characteristics.

An example of a somewhat different blend approach is to be found in the work of Allen and his co-workers, Polymer, Vol. 14; 597, 604 (1973); Vol. 15; 13, 19, 28 (1974).

In that work, polyols were reacted with diisocyanates and vinyl monomer, in the presence of a urethane catalyst, to give polyurethane polymers containing the vinyl monomer. Thereafter, the addition of a standard, non-reactive, azo initiator resulted in the polymerization of the vinyl monomer, giving a two-phase, blended system. While these products were reported to exhibit impact resistance in the order of that shown by high-impact polystyrene, or acrylonitrile-butadiene-styrene terpolymers, polymer blends thus formed lack the points of interconnection between the phases that have been found necessary to produce the enhanced interphase adhesion, and superior physical properties of the interconnected blended polymers disclosed herein.

DISCLOSURE OF THE INVENTION

In view of the preceding, therefore, it is a first aspect of this invention to provide polymer blends that display superior physical characteristics.

It is a second aspect of this invention to provide two-phase polymer blends that possess enhanced adhesion at their phase boundaries.

Another aspect of this invention is to modify the structure and properties of polymeric blends through the use of reactive initiators that enhance the adhesion between the solid phases of the blends.

Another aspect of this invention is to provide two-phase polymer blends that possess points of interconnection between the phases.

A further aspect of this invention is to prepare blends of two different polymers interconnected at their phase boundaries as a result of their interaction with reactive initiators.

Yet another aspect of this invention is to provide polymer blends that appear to limit the propagation of stress cracks.

A still further aspect of this invention is to provide polymer blends that demonstrate greater tensile strength, improved elastic recovery, and increased elongation at break.

It is a still additional aspect of this invention to provide processes for preparing polymer blends of the preceding type.

The foregoing and still additional aspects of this invention are provided by an interconnected polymeric blend comprising:
   a first polymer formed by the interaction of at least two different compounds in a non-free radical polymerization, and
   a second polymer formed in a free radical polymerization from at least one monomer containing carbon-to-carbon double bonds, said first and second polymers being bound to each other by means of reactive initiators that have been chemically attached to said first and second polymers, said reactive initiators comprising free radical initiators that contain a plurality of reactive functional groups.

The foregoing and yet other aspects of the invention are provided by a process for preparing polymer blends comprising:
   (1) preparing a reaction mixture that includes at least two different compounds reactive with each other to form a first polymer without the use of a free radical polymerization mechanism;
      at least one monomer containing carbon-to-carbon double bonds that is polymerizable to form a second polymer by a free radical polymerization mechanism; and
      a reactive initiator comprising free radical initiators that contain a plurality of reactive functional groups;

(2) polymerizing said compounds to form a combination comprising said first polymer, and said monomers; and (3) thereafter polymerizing said monomers, thereby forming a polymeric blend of said first and second polymers in which said polymers are connected to each other as a consequence of their chemical interaction with said reactive initiator.

BRIEF DESCRIPTION OF THE DRAWINGS

The invention will be better understood when reference is had to the following drawings, in which like-numbers refer to like-parts, and in which.

DETAILED DESCRIPTION OF THE INVENTION

The invention provides polymeric blends that include a discontinuous phase and a continuous phase, and in which the phase boundaries have points of interconnection of a type that promote the adhesion between the phases. Such enhanced adhesion assures that each of the phases, which comprise different polymeric materials, contributes the physical characteristics identified with such phase to the blend in the application in which the blend is utilized, thus providing an amalgamation of physical properties superior to the properties of either of the polymers used by itself.

The points of interconnection are achieved by combining the reactants necessary to produce a first of the polymers, with the monomers necessary to synthesize a second of the polymers. Certain "reactive initiators" are also included in the reaction mixture which have the capability of reacting with the first of the polymers, and thereafter acting as a free radical initiator for formation of the second of the polymers. Polymerization of the first polymer is initially carried out, typically by the addition of an appropriate catalyst, and after the reaction has proceeded to the desired point, most preferably after polymerization of substantially all of the polymer precursor compounds, the polymerization resulting in formation of the second polymer is promoted through the triggering action of the free radicals produced by the reactive initiators, which have also reacted with the first monomer.

If desired, and although the polymer blends resulting are in many cases inferior to those produced by the sequential polymerization described, the polymerization of the first and second polymers may be carried on concurrently.

The resulting blend comprises a continuous phase formed by the first polymer in which discrete particles are embedded, especially aggregates of such particles, comprising the second polymer. In addition to the interpenetrating molecular networks often present in the region of the phase boundaries, the two polymers are chemically bound at the phase boundaries by the action of the reactive initiator. Among the advantages of such polymer blends is the fact that they furnish an enhanced morphology that results in greater tensile strength, increased elongation at break, and better elastic recovery.

The process is to be compared to similar techniques, in which however, normal, non-reactive azo initiators have been used, a system that produces isolated particles of the second polymer poorly adhered to the continuous phase of the first polymer, the relatively poor adhesion obtained resulting in inferior physical characteristics compared to those exhibited by the polymers of the invention.

Figure 1:
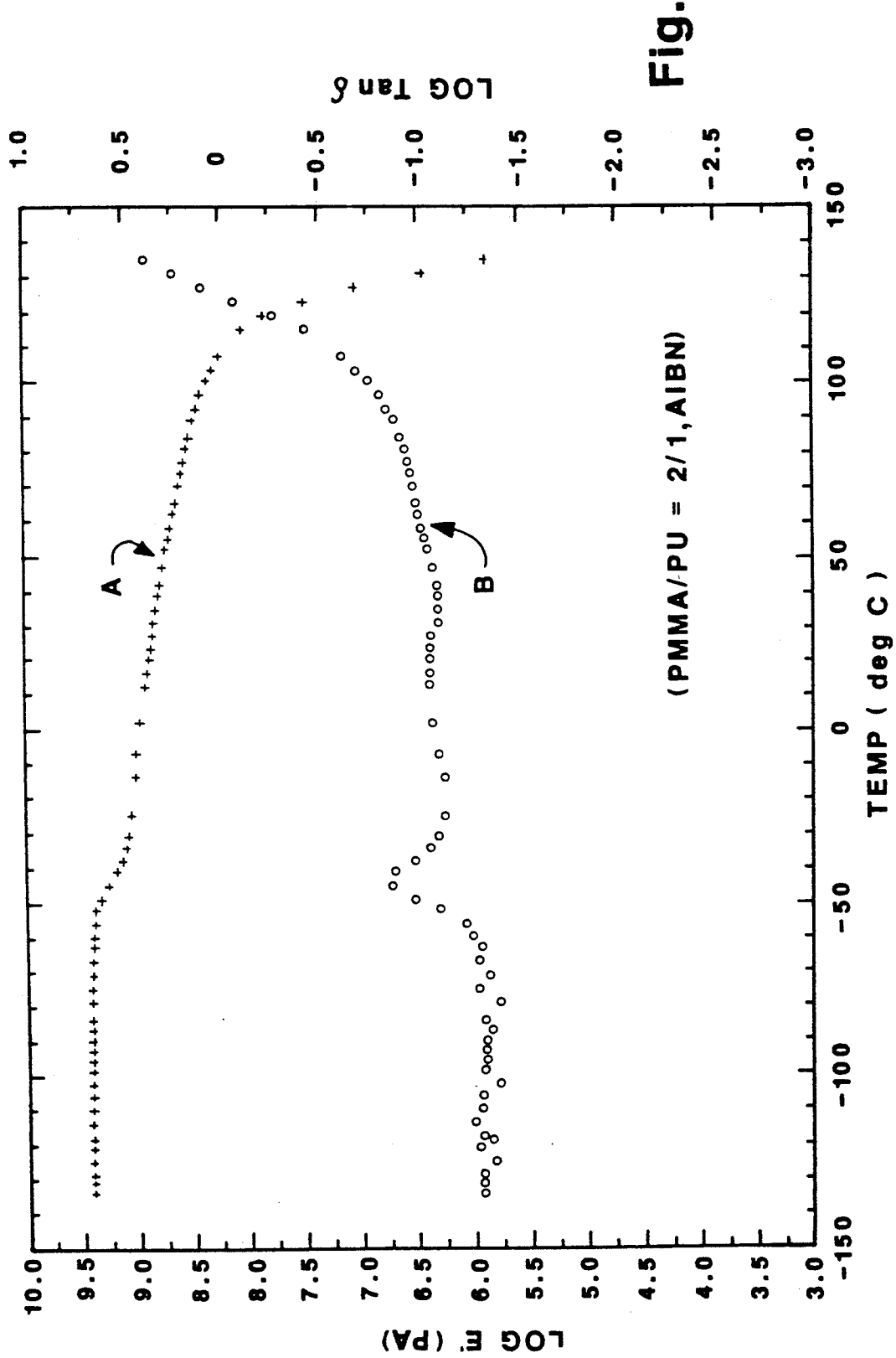
FIG. 1 is a plot showing dynamic mechanical loss properties of a polymethylmethacrylate/polyurethane, 2/1 on a weight basis, blend prepared with a standard, non-reactive, initiator (AIBN).
Figure 2:
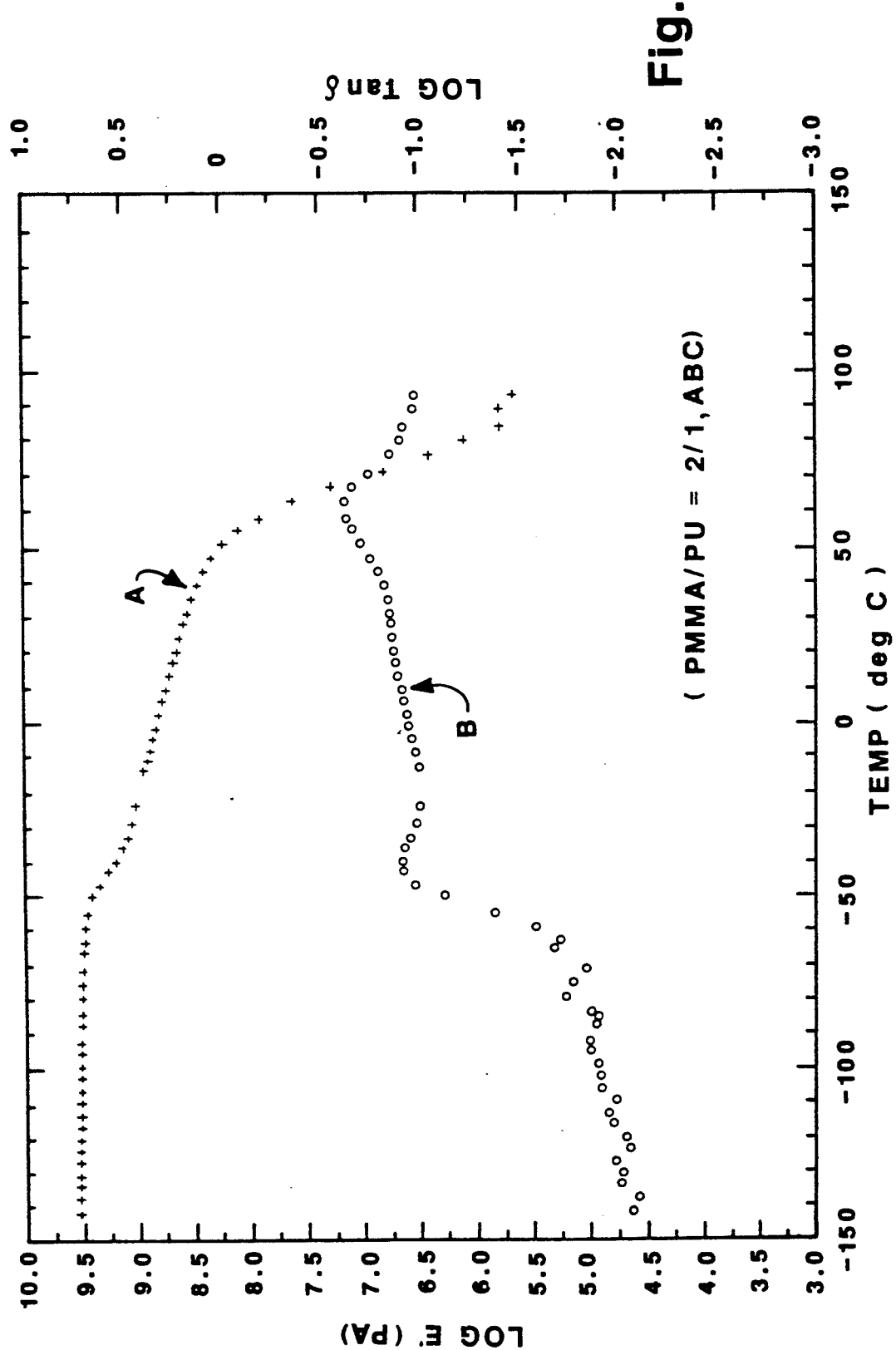
FIG. 2 is a plot similar to that of FIG. 1 in which, however, the blend is prepared with a reactive initiator (ABC) of the invention.

Some of the differences between polymerizations conducted with reactive initiators, relative to those carried on without them is to be seen in FIG. 1 and FIG. 2, which display mechanical loss properties of polymethylmethacrylate/polyurethane blends in 2 to 1 weight ratios, where both the storage modulus E', curve A, and the loss tangent, tan delta, curve B, are plotted as functions of temperature. FIG. 1 employs a standard, non-reactive initiator, azo-bis-isobutyronitrile, AIBN, to initiate reaction of the polymethylmethacrylate, while FIG. 2, employs a reactive initiator of the invention, azo-bis-(4'-cyanovaleric acid), ABC. A large loss process is seen near $-45°$ C. for both initiator systems. This is the glass transition temperature of polyurethane, PU, and marks the temperature at which the polyurethane phase becomes rubbery in nature. Hence the loss process peak is accompanied by a distinct step in the E' curves. In terms of the domain morphology of the polymer blends, any interaction between the two phases will provide more hindrance to motions in the polyurethane, causing broader polyurethane glass transition peaks. Comparison of the curves indicates that the polymer blend produced with the reactive initiator has the broader polyurethane transition peak, confirming that the blend produced by the reactive initiator provides a polymethylmethacrylate phase that is more tightly bound to the continuous polyurethane phase, than when a non-reactive initiator is employed.

The tests on which the FIGS. 1 and 2 are based are carried out on a DMTA MK II, manufactured by Polymer Laboratories. The equipment is controlled with a microcomputer, and motion of the system is monitored by a displacement transducer. Samples are placed in the DMTA head, which is controlled to within + or $-1°$ C. over the temperature range from $-140°$ C. to $+150°$ C. Samples measuring $1 \times 5 \times 40$ mm are employed in the testing.

Figure 4:
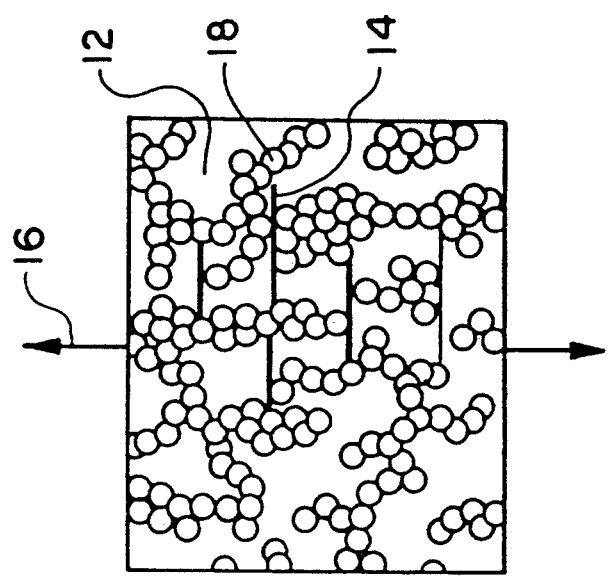
FIG. 4 is a semi-schematic representation similar to that of FIG. 3, in which however, the blend is prepared with a reactive initiator of the invention.
Figure 3:
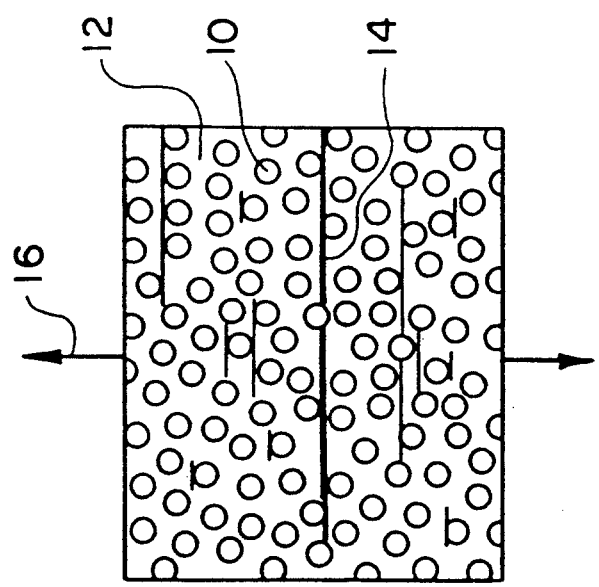
FIG. 3 is semi-schematic representation of a polymer blend made with a standard, non-reactive initiator, showing the morphology thereof, and the crazing that results when a sample prepared therefrom is subjected to tensile stressing.

While not wishing to be bound by the theory, examination of electron micrographs of polymer blends formed with the standard, nonreactive initiators of the invention appears to show that the second polymer, in the case of the polymethymethacrylate/polyurethane blends, the PMMA, tends to form a phase comprising substantially spherical domains dispersed relatively uniformly in the elastomeric polyurethane continuous phase. By way of contrast, it appears that polymer blends prepared with the reactive initiators of the invention tend to result in structures in which the spherical domains of the PMMA phase are substantially interconnected in the form of aggregates. Examples of such different morphology are shown, respectively, in FIGS. 3 and 4. It is speculated that in a blend in which the discontinuous phase 10 is dispersed, as illustrated in FIG. 3, when the blend is subjected to tensile stressing in the direction of the arrows 16 associated with FIG. 3, stress cracks 14 are initiated which progress across the material, resulting in its eventual failure. As shown in FIG. 4, when the discontinuous phase is interconnected, or bound together in the form of aggregates 18, such aggregates "intercept" the stress cracks or crazes, tending to prevent their further growth, thus considerably increasing the extent to which the material can be tensily stressed before failure.

Figure 5:
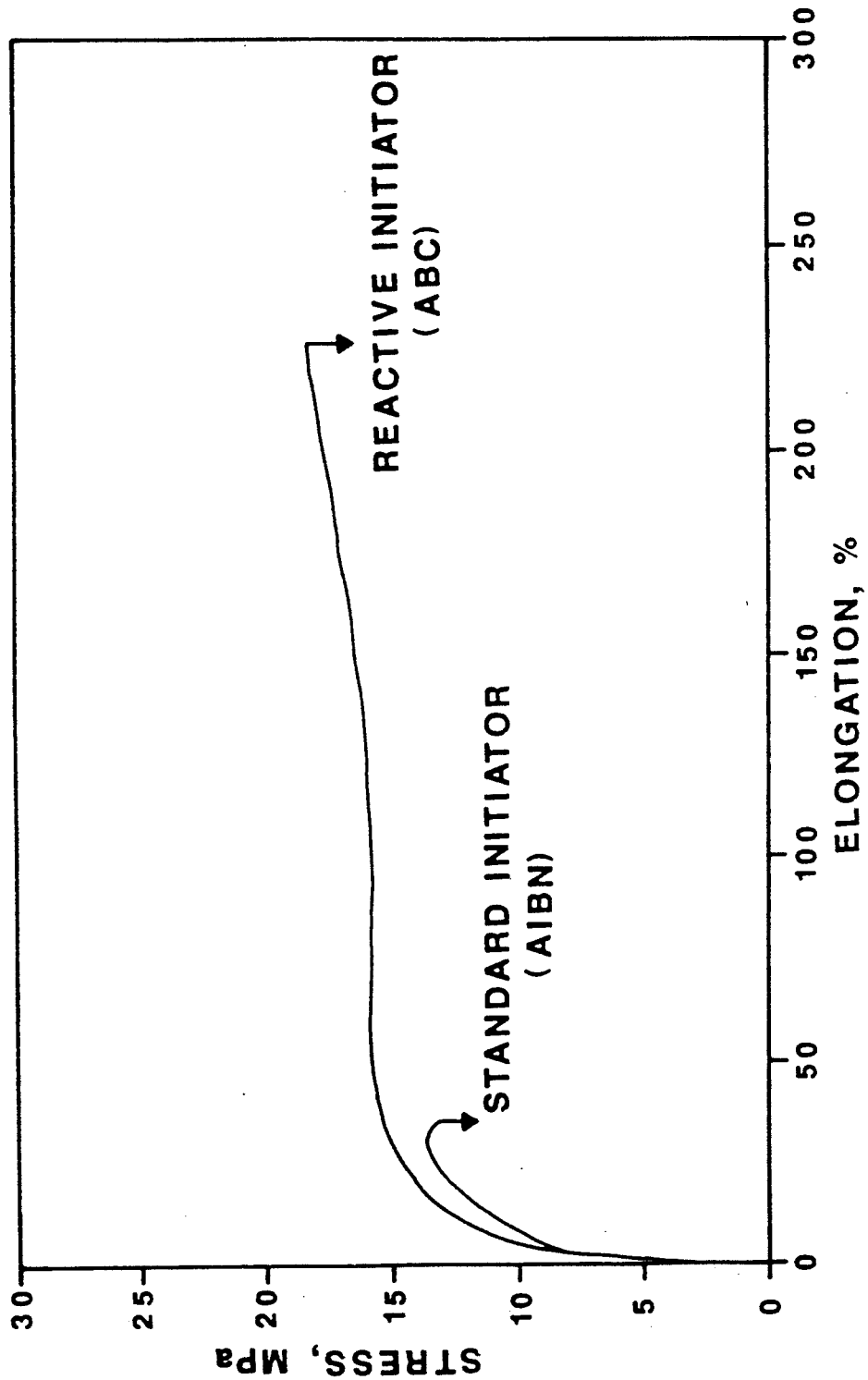
FIG. 5 is a stress-strain plot showing curves for a sample made from a polymethylmethacrylate/polyurethane, 2/1 on a weight basis, blend prepared with a standard, non-reactive, initiator (AIBN), and a sample made from a similar blend prepared with a reactive initiator (ABC) of the invention.

Irrespective of the mechanism of enhancement of the physical properties, however, the significantly higher elasticity, and higher tensile strengths obtainable by use of the invention are apparent from FIG. 5, in which tensile curves are shown both for a sample made from a blend prepared with a standard, non-reactive initiator, AIBN, and a sample made from a blend prepared with a reactive initiator of the invention, ABC. The tensile tests whose results are shown are performed on a conventional Instron testing machine, Model 1123, at a strain rate of 100% per minute, using a load cell capable of measuring up to 25 kilonewton loads. The test specimens are machined on a high speed router with aluminum templates, which have the type IV geometry described in ASTM D-638. Stress-strain calculations are based on the initial cross-sectional recovery of the specimen and cross-head displacement.

Briefly stated, the reaction mixtures employed to produce the blends of the invention are prepared by combining the compounds required to form the polymer constituting the continuous phase of the polymer blend, together with any catalyst necessary to initiate the polymerization by a non-free radical polymerization mechanism, and including the monomers containing carbon-to-carbon unsaturation that are to form the discontinuous phase. To the reaction mixture is also added a reactive initiator of the invention, the latter being a free radical initiator that contains a plurality of reactive functional groups.

The compounds required for the continuous phase are then polymerized to form that phase, the polymer usually causing gelation of the reaction mixture. Some of the functional groups of the reactive initiator react with the polymer thus formed, providing a source of free radicals necessary for polymerization of the monomers making up the discontinuous phase, the formation of which normally follows the initial polymerization. The resulting product is a blend of polymers, comprising one polymer existing as aggregates of interconnected spherical domains in one phase, the latter being tightly bound to the polymer making up the other, continuous, phase as a result of the functioning of the reactive initiator as described.

The polymer making up the continuous phase, sometimes referred to herein as the first polymer, is formed by the chemical interaction of at least two different compounds reactive with each other to form a polymer without operation of a free radical polymerization mechanism. Examples of suitable polymers are polyurethanes, such as those formed by the condensation reaction of polyisocyanates and hydroxyl-containing materials, a preferred embodiment, as well as epoxy resins, for example, condensation products made from epichlorohydrin and bisphenol A, the "Epon" resins sold by Shell under that trademark being representative, and polysiloxanes.

In the case of the diisocyanates, any of those normally employed in the synthesis of polyurethane polymers provide satisfactory results, including such compounds as methylene di-p-phenylene isocyanate, "MDI"; toluene diisocyanate, "TDI"; methylene diphenyl diisocyanate urethane polymers, for example, those sold under the trademark "Papi"; and other, equivalent, well-known polyisocyanate compounds.

Suitable hydroxyl-containing materials include such compounds as polyethylene glycols; polypropylene glycols; mixed polyether glycols; polytetrahydrofuran; polyethylene adipate with hydroxyl and/or carboxyl end groups; other polyesters thus terminated; carboxy, hydroxy, or amino terminated polybutadiene, "Poly BD", a hydroxy-terminated polybutadiene sold under that trademark by the Sartomer Company being one example of such materials; dicarboxy derivatives of copolymers of butadiene and acrylonitrile; synthetic rubbers based on epichlorohydrin of the type marketed under the trademark "Hydrin", and other reactive oligomers; hydroxyl or carboxyl terminated polyisobutylenes; hydroxyl terminated polycarbonate materials of the kind marketed under the trademark "Durocarb"; 1,2-polybutadiene glycols of the type marketed under the trademark "Ricon"; dicarboxy and dihydroxy copolymers of butadiene/acrylonitrile, poly(phenylene oxide) functional oligomers; oligomers of "PEEK", polyetheresterketones marketed by ICI Ltd., and other equivalent compounds of the types well known in the art.

Generally the hydroxyl, carboxyl, or amino-containing materials, including those of the types mentioned, are reacted with the diisocyanates of the kind described in the presence of polyurethane catalysts, for instance, tin compounds such as dibutyltin laurate, and other, equivalent catalysts. In the preparation of epoxide-type polymers, catalysts such as, for example, amine compounds are also used as catalysts, in conjunction with well-known processing techniques. In the case of some of the siloxone polymers, however, catalysts are not required for their formation. In those instances where a catalyst is required, a catalyst such as, for example, a tertiary amine can be employed.

Monomers of the type contemplated by the invention, being those polymerizable by a free radical polymerization mechanism, include compounds such as methyl methacrylate; acrylates such as methyl, ethyl, butyl, and octyl; styrene; styrene/acrylonitrile mixtures; styrene/butadiene mixtures; acrylate and acrylonitrile mixtures; vinyl chloride; vinyl chloride mixed with acrylates; vinyl acetate and mixtures thereof; acrylonitrile; and various other similar and equivalent monomers. If desired, and depending upon the physical characteristics required of the polymer blends; a portion of the monomers may be prepolymerized before being added to the reaction mixture.

The reactive initiators found to be useful for purposes of the invention include free radical initiators that contain a plurality of functional groups. Such materials include peroxides that contain multiple carboxyl or hydroxyl functions, as well as polyfunctional azo compounds. Among such azo compounds, the preferred reactive initiators, may be mentioned 4, 4'-Azobis (4-cyano-pentanoic acid); 2, 2'-Azobis {2-methyl-N-[1, 1-bis (hydroxymethyl)-2-hydroxy ethyl] propionamide}; 2, 2'-Azobis {2-methyl-N-[1, 1-bis (hydroxymethyl) ethyl] propionamide}; 2, 2'-Azobis [2-methyl-N-(2-hydroxyethyl) propionamide], and various other similar polyfunctional azo compounds.

Among suitable peroxides may be mentioned 4, 4 bis hydroxymethyl benzoyl peroxide; 6,6 dihydroxy caproic peroxide, and equivalent compounds.

In some instances, where an elastomeric phase is present, it can be beneficial to add materials of the types well-known in the art that permit cross-linking, or vulcanization of the phase to be accomplished.

Components such as those mentioned, and optionally, additional materials as described more particularly in the following, are added together to form the reaction mixture, preparatory to carrying out the polymerization. The order of addition may be varied, depending upon the components to be introduced; however, except in situations in which heterogenous systems are desired, it is ordinarily desirable to add the components in an order that avoids the formation of intermediates and products insoluble in the reaction mixture. The presence or absence of insolubility will vary from system-to-system, but may be determined by simple experimentation.

The temperature at which the reactions are conducted will likewise depend upon the nature of the components, and their method of interaction; however, the temperature will ordinarily be adjusted to avoid excessively rapid reactions, which tend to be uncontrollable, or temperatures high enough to cause substantial escape of the components due to volatility. The temperatures will desirably also be kept below the point at which decomposition of the reactants occurs. One technique sometimes employed involves carrying out the synthesis of the first polymer to substantial completion, often accompanied by the formation of a gel containing the monomers required to form the second polymer of the blend. Thereafter, the temperature of the reaction mixture can be successively raised in a sequence of polymerization steps, providing a technique that helps to control the reaction rate, and at the same time one that results in the polymerization of essentially all of the monomers present.

As in the case of the reaction temperature, the reaction times will depend upon the nature of the system being used. Again, optimum times for the results desired will usually be determined by empirical experimentation.

As previously described, formation of the first polymer, provided by the reaction of at least two different compounds in a non-free radical polymerization, typically results in the formation of a gelled material, i.e., a mixture in which the dispersed monomeric phase has combined with the continuous phase of the first polymer to produce a viscous, jelly-like product. In the case of the polyurethane polymers, the gelation period often will require as much as 12, sometimes 24 hours to complete. The more complete the gelation, usually the more elastomeric the final product will be. Consequently, although not essential, in a preferred mode of the invention, it is desirable that the first polymerization be substantially complete before the temperature of the reaction mixture is increased to accelerate formation of the second, free radical polymerization.

The ratio of the first to the second polymer will depend upon the physical characteristics desired, and may be varied within miscibility limits of the range of the ratios possible. In the case of elastomeric polymers, the more of the former employed, usually the greater will be the elasticity of the final product.

With respect to the ratio of initiator to the resulting blend, it has been found that the use of too-great an amount of reactive initiator often produces molecular weights in the second polymer lower than desired. In ordinary circumstances, about 0.025% to about 5.0% of reactive initiator will be used, based on the total weight of the final polymeric blend produced. In a preferred embodiment, about 0.12% to about 1.0% of the reactive initiator will be present.

In the case of the urethane components, the molar ratio of the isocyanate to hydroxyl groups will have an important bearing in determining the mechanical properties of the polymeric blends. Normally, enough of the isocyanate component is employed to not only interact with the reactive initiator, but with any other reactive components present. Thus, a molar ratio of slightly in excess of 1 to 1, isocyanate to hydroxyl-containing compound, will often be used.

As previously explained, it is normally desirable that the reaction mixture maintain the reaction components in solution therein. Consequently, the solubility characteristics of the reaction components will frequently have an important bearing on their selection. In some instances, solvents such as, for example, ethyl acetate, butyl acetate, or other solvents having an equivalent solubilizing effect, will be added to the reaction mixture to assure solubility of the components. In addition, the reactive initiators will commonly be dissolved in a suitable solvent, for instance, dimethyl acetamide, to assure their availability in liquid form in the reaction mixture. The inclusion of suitable amounts of solvents can also assist in the handling of the reaction mixtures, and may be used to modify the properties of the product such as its porosity, the process of phase separation, homogeneity, and so forth.

The polymerizations of the invention may be carried out by casting the polymer blends of the reaction mixtures into molds suitable for the purpose, and in which the gelation of the first polymer and subsequent free radical polymerization of the second polymer is carried out. Alternatively, the intermediate gel can be prepared in particulate form, and the free radical polymerization thereafter carried out in a fluid bed, a tumbling device, in aqueous slurries, or in other equivalent systems.

The following examples, while not intended to be limiting in nature, are illustrative of the invention.

EXAMPLE 1

A series of experiments is carried out to illustrate the improved physical characteristics obtainable by preparing polymer blends in the presence of a reactive initiator, compared with preparations in which a standard, non-reactive initiator is used.

Table 1, below, describes the components used in the reaction mixtures, while Table 2 lists the amounts of components employed.

The reactions are carried out by dissolving the polyols and the tin polyurethane catalysts in methyl methacrylate under a dry nitrogen atmosphere at room temperature. The MDI is thereafter added, resulting in commencement of urethane formation. After ten minutes the appropriate initiator is introduced to the reaction mixture. Prior to the gelation caused by formation of the polyurethane, the reaction mixture is degassed for approximately three minutes, and thereafter poured into a mold. The sample thus prepared is maintained at room temperature for 24 hours to obtain substantially complete gelation, and is thereafter heated at 50° C. for 48 hours; at 90° C. for 1 hour; and at 120° C. for a further 2 hours to complete polymerization of the poly(methyl methacrylate) phase.

Tensile tests are thereafter performed according to the procedure previously described. The recovery calculations are based on the specimen length at fracture, and the length after full recovery, recovery being defined as the former minus the latter, divided by the former. The results of the tensile tests are set forth in Table 3 for the blends made with standard, non-reactive, initiators, and in Table 4 for blends prepared with the reactive initiator.

TABLE 1

| Compounds | | |
|---|---|---|
| Functional Component | Mtl. used | Mtl. source |
| Diol | Polyether diol, MW = 2000 (PPG-2025) | Union Carbide |
| Triol | Polyether triol, MW = 3000 (LG-56) | Union Carbide |
| Isocyanate | 4,4-Diphenylmethane diisocyanate | BASF Corp. |
| Urethane catalyst | Dibutyltin dilaurate | Aldrich Chemical |
| Vinyl monomer | Methyl methacrylate | Aldrich Chemical |
| Std. non-reactive, initiator | Azobisisobutyronitrile (AIBN) | Aldrich Chemical |
| Reactive azo initiator | 4,4-azobis(4-cyanovaleric acid) (ABC) | Aldrich Chemical |
| Solvent for ABC | N,N-Dimethylacetamide | Aldrich Chemical |

TABLE 2

| | Mixture Composition | |
|---|---|---|
| Mtl. | Std, Non-reactive Initiator Blend | Reactive Initiator Blend |
| 4,4-Diphenylmethane diisocyanate | 2.75 g (11 m mole) | 2.75 g (11 m mole) |
| Polyether diol (PPG-2025) | 10 g (5 m mole) | 8 g (4 m mole) |
| Polyether triol (LG-056) | 10 g (3.3 m mole) | 10 g (3.3 m mole) |
| Methyl methacrylate | 45 g | 42 g |
| Azobisisobutyronitrile | 0.16 g (1 m mole) | — |
| 4,4-azobis(4-cyanovaleric acid) | — | 0.28 g (1 m mole) |
| N,N-Dimethylacetamide | — | 2 ml |

TABLE 3

| | | Std, Non-reactive, Initiator Blends | | | | |
|---|---|---|---|---|---|---|
| Sample | Modulus | Strain at Maximum | Stress at Maximum | Fracture Strain | Fracture Stress | Elastic Recovery |
| 1A | 313 MPa | 30% | 15.4 MPa | 40% | 14.0 MPa | 23% |
| 1B | 299 | 31 | 15.1 | 35 | 14.8 | 21 |
| 1C | 305 | 31 | 16.1 | 38 | 15.2 | 23 |
| 1D | 284 | 28 | 17.9 | 63 | 15.9 | 29 |
| 1E | 267 | 27 | 15.0 | 49 | 13.7 | 27 |
| Average | 294 | 29.4 | 15.9 | 45 | 14.7 | 24.6 |
| SD* | 18 | 1.8 | 1.2 | 11 | 0.9 | 3.3 |

*SD = Standard Deviation

TABLE 4

| | | Reactive Initiator Blends | | | | |
|---|---|---|---|---|---|---|
| Sample | Modulus | Strain at Maximum | Stress at Maximum | Fracture Strain | Fracture Stress | Elastic Recovery |
| 2A | 227 MPa | 60% | 14.2 MPa | 236% | 16.5 MPa | 40% |
| 2B | 262 | 58 | 15.9 | 226 | 18.2 | 37 |
| 2C | 263 | 58 | 15.0 | 184 | 16.4 | 37 |
| 2D | 295 | 42 | 16.7 | 210 | 19.5 | 35 |
| 2E | 215 | 58 | 16.6 | 209 | 19.1 | 48 |
| 2F | 225 | 63 | 16.7 | 208 | 19.4 | 46 |
| 2G | 247 | 64 | 16.9 | 215 | 19.7 | 48 |
| Average | 248 | 57.6 | 16.0 | 213 | 18.4 | 41.6 |
| SD* | 28 | 7.3 | 1.0 | 16 | 1.4 | 5.6 |

*SD = Standard Deviation

As is apparent from the data contained in Tables 4 and 5, the blends formed with the reactive initiator system have greater strength, increased elongation at break, better elastic recovery, and only slightly lower modulus, compared to those prepared with the standard, non-reactive, initiator system. Comparable observations are made with similar systems using polybutadiene diol in place of the polyether diol.

In still further experiments, a variety of modifications of the polymerization systems are explored in the following.

EXAMPLE 2

In the experiments, the hydroxyl component of the first polymer, a polyurethane, is weighed into a small bottle, along with the other desired active components, about which more will be said later. The free radical polymerizable monomer is also added, together with a small amount (0.2 g.) of dibutyl tin laurate, the catalyst selected for the polyurethane formation. The bottle is sealed with a stopper equipped with tubes for flushing with nitrogen, as well as for the addition of reaction materials and the discharging of the reaction mixture.

The bottle contents are flushed with nitrogen for several minutes, a vacuum is applied to the bottle for 2 minutes in order to degas the monomer to make the final product bubble-free. A dry nitrogen atmosphere is maintained over the sample during the remainder of the experiment.

Next, the diisocyanate is added, and the contents of the bottle are stirred with a magnet. After about 5 to 10 minutes, a solution of the azo initiator compound, 0.15 g, and 1.0 g of dimethylacetamide, a non-reactive initiator is added. After about 15 to 30 minutes, in the case of higher content polyurethane compositions, or 102 hours with the lower content composition, the mixture is seen to have become much more viscous, approaching the gel state.

The contents of the bottle are then discharged, usually with nitrogen pressure, into small molds. The molds and their polymeric blend contents are thereafter held at room temperature for 2 days. During the first 1 to 2 hours, the mixture has completely jelled, indicating a substantially complete polyurethane reaction.

The molds are then placed in a 60° C. oven for 2 days to effect the desired polymerization of the monomers through the free radical mechanism initiated by the azo catalyst. The polymerization of the residual monomer is completed by heating the molds at 120° C. for at least 4 hours. The molds are thereafter cooled, and the samples removed. Samples suitable for ASTM testing on an Instron machine are then cut from the samples and tested. The tables below set forth the nature of the components, their relative amounts, and the physical properties of the polymeric blends obtained.

As illustrated in a number of the following, various modifier compounds may also be added to the reaction mixture to modify the physical characteristics of the polymer blends. Among such materials, for instance, may be mentioned hydroxyethyl methacrylate; 1, 4-butanediol, ethylene glycol, as well as other reactive materials. In some cases, the addition of such materials produces relatively hard domains in the polymer blends that enhance their plastic characteristics.

Example 3 (Reactive Initiator)

| Sample # | 1006a | 1006b | 1006m | 1006n | 1006o |
|---|---|---|---|---|---|
| Monomer (1) | 60 | 60 | 60 | 60 | 60 |
| Hydroxyl cpd. (2) | 30 | 30 | 30 | 30 | 30 |
| Isocyanate cpd. (3) | 35 | 35 | 35 | 35 | 35 |
| Initiator cpd. (4) | 0.15 | 0.15 | 0.15 | 0.15 | 0.15 |
| Monomer cure steps: | | | | | |
| First | 2 days/ room temp. | 2 da/rt | 2 da/rt | 2 da/rt | 2 da/rt |
| Second | 2 days/ 60° C. | 2 da/ 60° C. | 2 da/ 60° C. | 2 da/ 60° C. | 2 da/ 60° C. |
| Third | 3 days/ 120° C. | 3 da/ 120° C. | 3 da/ 120° C. | 3 da/ 120° C. | 3 da/ 120° C. |
| Tensile. MPa | 18.68 | 18.29 | 11.42 | 17.94 | 17.16 |
| % Elong. | 198.58 | 178.57 | 99.68 | 192.04 | 180.88 |
| Initial modulus, MPa | 36.09 | 48.95 | 46.46 | 36.70 | 43.55 |

(1) methyl methacrylate. - g.
(2) Polybutadiene diol. "Poly BD" - mil. equiv. wts.
(3) MDI - mil. equiv. wts.
(4) Azo-bis - (4'-cyanovaleric acid), (ABC) - g.

Example 4 (Std., Non-reactive Initiator)

| Sample # | 1007d | 1007e | 1007f | 1009p | 1009q | 1009r |
|---|---|---|---|---|---|---|
| Monomer (1) | 60 | 60 | 60 | 60 | 60 | 60 |
| Hydroxyl cpd. (2) | 30 | 30 | 30 | 30 | 30 | 30 |
| Isocyanate cpd. (3) | 35 | 35 | 35 | 35 | 35 | 35 |
| Initiator cpd. (4) | 0.15 | 0.15 | 0.15 | 0.15 | 0.15 | 0.15 |
| Monomer cure steps: | | | | | | |
| First | 2 days/ room temp. | 2 da/rt | 2 da/rt | 2 da/rt | 2 da/rt | 2 da/rt |
| Second | 2 days/ 60° C. | 2 da/ 60° C. | 2 da/ 60° C. | 2 da/ 60° C. | 2 da/ 60° C. | 2 da/ 60° C. |
| Third | 3 days/ 120° C. | 3 da/ 120° C. | 3 da/ 120° C. | 3 da/ 120° C. | 3 da/ 120° C. | 3 da/ 120° C. |
| Tensile, MPa | 15.57 | 15.98 | 15.71 | 12.60 | 13.14 | 16.00 |
| % Elong. | 121.23 | 134.70 | 136.62 | 81.59 | 90.44 | 128.92 |
| Initial modulus, MPa | 57.14 | 75.34 | 72.56 | 101.21 | 87.11 | 84.01 |

(1) methyl methacrylate. (MMA) - g.
(2) Polybutadiene diol. (PBD)-mil. equiv. wts.
(3) MDI - mil. equiv. wts.
(4) Azo-bis - isobutyronitrile, (AIBN) - g.
Comparison of the physical testing results of Example 3, compared to Example 4, again confirms improved tensiles, superior elongation, and somewhat reduced initial modulus.

A further experiment is run to demonstrate that a variety of reactive initiators may be used to obtain polymer blends exhibiting superior physicals, as previously noted.

Example 5 (Reactive Initiator)

| Sample # | 1011m | 1011n | 1011o |
|---|---|---|---|
| Monomer (1) | 60 | 60 | 60 |
| Hydroxyl cpd. (2) | 30 | 30 | 30 |
| Isocyanate cpd. (3) | 35 | 35 | 35 |
| Initiator cpd. (4) | 0.15 | 0.15 | 0.15 |
| Monomer cure steps: | | | |
| First | 2 days/ room temp. | 2 da/rt | da/rt |
| Second | 2 days/ 60° C. | 2 da/60° C. | 2 da/60° C. |
| Third | 3 days/ 120° C. | 3 da/120° C. | 3 da/120° C. |
| Tensile, MPa | 13.05 | 14.88 | 14.97 |
| % Elong | 130.46 | 182.80 | 139.32 |
| Initial modulus, MPa | 37.18 | 36.48 | 50.89 |

(1) methyl methacrylate. (MMA) - g.
(2) Polybutadiene diol. (PBD)-mil. equiv. wts.
(3) MDI - mil. equiv. wts.
(4) 2-2'-Azo-bis {2-methyl-N-(2-hydroxyethyl)-propioamide}, (ABH)-g The following examples 6 & 6a illustrate that reactive modifier compounds such as hydroxy ethyl methacrylate fail to produce the improved elasticity that has been discovered to be obtainable through the use of the reactive initiators of the invention, even at high levels of modifier.

Example 6 (Reactive Initiator - Modifier Compound)

| Sample # | 113a | 113b |
|---|---|---|
| Monomer (1) | 60 | 60 |
| Hydroxyl cpd. (2) | 30 | 30 |
| Isocyanate cpd. (3) | 60 | 60 |
| Initiator cpd. (4) | 0.14 | 0.14 |
| Modifier cpd. (5) | 0.15 | 0.15 |
| Monomer cure steps: | | |
| First | 2 da/rt | 2 da/rt |
| Second | 2 da/60° C. | 2 da/60° C. |
| Third | 3 da/118° C. | 3 da/118° C. |
| Tensile, MPa | 19.58 | 15.35 |
| % Elong. | 147.78 | 163.18 |

-continued
Example 6
(Reactive Initiator - Modifier Compound)

| Sample # | 113a | 113b |
|---|---|---|
| Initial modulus, MPa | 334.75 | 343.75 |

(1) methyl methacrylate, (MMA) - g.
(2) Polybutadiene diol, (PBD)-mil. equiv. wts.
(3) MDI - mil. equiv. wts.
(4) Azo-bis - isobutyronitrile, (AIBN) - g.
(5) Hydroxy ethyl methacrylate, (HEMA) - mil. equiv. wts.

Example 6a
(Standard, non-reactive Initiator - Modifier compound)

| Sample # | 1051a | 1051b | 1051c | 1052d | 1052e | 1052f |
|---|---|---|---|---|---|---|
| Monomer (1) | 60 | 60 | 60 | 60 | 60 | 60 |
| Hydroxyl cpd. (2) | 30 | 30 | 30 | 30 | 30 | 30 |
| Isocyanate cpd. (3) | 35 | 35 | 35 | 35 | 35 | 35 |
| Initiator cpd. (4) | 0.15 | 0.15 | 0.15 | 0.15 | 0.15 | 0.15 |
| Modifier cpd. (5) | 2 | 2 | 2 | | | |
| Monomer cure steps: | | | | | | |
| First | 2 days/ room temp. | 2 da/rt | 2 da/rt | 2 da/rt | 2 da/rt | 2 da/rt |
| Second | 2 days/ 60° C. | 2 da/ 60° C. | 2 da/ 60° C. | 2 da/ 60° C. | 2 da/ 60° C. | 2 da/ 60° C. |
| Third | 3 days/ 120° C. | 3 da/ 120° C. | 3 da/ 120° C. | 3 da/ 120° C. | 3 da/ 120° C. | 3 da/ 120° C. |
| Tensile, MPa | 27.58 | 24.80 | 25.31 | 27.90 | 22.53 | 24.36 |
| % Elong. | 163.18 | 142.78 | 160.87 | 194.35 | 138.55 | 152.78 |
| Initial modulus, MPa | 239.71 | 243.57 | 193.31 | 146.98 | 136.18 | 157.63 |

(1) methyl methacrylate, (MMA) - g.
(2) Polybutadiene diol, (PBD)-mil. equiv. wts.
(3) MDI - mil. equiv. wts.
(4) Azo-bis-isobutyronitrile, (AIBN)
(5) Hydroxyethyl acrylate, (HEMA) - mil. equiv. wts.

In a further experiment, a portion of the methylmethacrylate is pre-polymerized with both a reactive initiator, and a standard, non-reactive initiator, prior to initiating the polyurethane polymer formation. In the procedure, all components except the MDI are mixed and heated to 40° C. for one hour, causing a portion of the methyl methacrylate to polymerize, and the mixture to become viscous. The product is thereafter cooled to room temperature, the MDI is added, and the reaction mixture is processed in the usual manner to produce the desired polymeric blend.

Example 7
(Reactive Initiator - Modifier cpd.)

| Sample # | 1053a | 1053b | 1053c | 1054d | 1054e | 1054f |
|---|---|---|---|---|---|---|
| Monomer (1) | 60 | 60 | 60 | 60 | 60 | 60 |
| Hydroxyl cpd. (2) | 30 | 30 | 30 | 30 | 30 | 30 |
| Isocyanate cpd. (3) | 35 | 35 | 35 | 35 | 35 | 35 |
| Initiator cpd. (4) | 0.15 | 0.15 | 0.15 | | | |
| Initiator cpd. (5) | | | | 0.15 | 0.15 | 0.15 |
| Monomer cure steps: | | | | | | |
| First | 2 days/ room temp. | 2 da/rt | 2 da/rt | 2 da/rt | 2 da/rt | 2 da/rt |
| Second | 2 days/ 60° C. | 2 da/ 60° C. | 2 da/ 60° C. | 2 da/ 60° C. | 2 da/ 60° C. | 2 da/ 60° C. |
| Third | 3 days/ 120° C. | 3 da/ 120° C. | 3 da/ 120° C. | 3 da/ 120° C. | 3 da/ 120° C. | 3 da/ 120° C. |
| Tensile, MPa | 18.50 | 20.22 | 21.76 | 21.29 | 19.75 | 20.37 |
| % Elong. | 151.63 | 166.25 | 194.73 | 176.26 | 170.49 | 169.72 |
| Initial modulus, MPa | 107.28 | 139.18 | 158.16 | 98.01 | 149.52 | 126.92 |

(1) methyl methacrylate, (MMA) - g.
(2) Polybutadiene diol, (PBD)-mil. equiv. wts.
(3) MDI - mil. equiv. wts.
(4) Azo-bis - (4'-cyanovaleric acid), (ABC) - g.
(5) Azo-bis - isobutyronitrile, (AIBN) - g.

In a still further experiment, styrene, together with acrylonitrile is substituted for methyl methacrylate as follows.

Example 8

| Sample # | 130m | 130n | 130o | 131p | 131q |
|---|---|---|---|---|---|
| Monomer (1) | 60 | 60 | 60 | 60 | 60 |
| Hydroxyl cpd. (2) | 15 | 15 | 15 | 15 | 15 |
| Isocyanate cpd. (3) | 17.5 | 17.5 | 17.5 | 17.5 | 17.5 |
| Initiator cpd. (4) | 0.15 | 0.15 | 0.15 | | |
| Initiator cpd. (5) | | | | 0.15 | 0.15 |
| Monomer cure steps: | | | | | |
| First | 2 days/ room temp. | 2 da/rt | 2 da/rt | 2 da/rt | 2 da/rt |
| Second | 2 days/ 60° C. | 2 da/ 60° C. | 2 da/ 60° C. | 2 da/ 60° C. | 2 da/ 60° C. |
| Third | 3 days/ 120° C. | 3 da/ 120° C. | 3 da/ 120° C. | 3 da/ 120° C. | 3 da/ 120° C. |
| Tensile, MPa | 16.87 | 18.74 | 18.76 | 9.15 | 11.38 |
| % Elong. | 111.22 | 105.83 | 106.60 | 13.08 | 86.51 |
| Initial modulus, MPa | 286.56 | 480.28 | 314.87 | 172.22 | 344.26 |

(1) Styrene/acrylonitrile, 80/20 on a wt. basis
(2) Polybutadiene diol, (PBD)-mil. equiv. wts.
(3) MDI - mil. equiv. wts.
(4) Azo-bis - (4'-cyanovaleric acid), (ABC) - g.
(5) Azo-bis - isobutyronitrile, (AIBN)

EXAMPLE 9

In yet another experiment, a hydroxy terminated butadiene/acrylonitrile copolymer is dissolved in an 80/20, by weight, mixture of styrene and acrylonitrile contained in a bottle of the type described in connection with Example 2. After addition of the other reactants, and subsequent polymerization following the precedure of Example 2, an acrylonitrile/butadiene/styrene-type polymer blend is obtained, which displays improved flexibility.

Two similar experiments are carried out, one in which hydroxy terminated polybutadiene is added to a 50/50, by weight, mixture of ethyl acrylate and butyl acrylate, and one in which the hydroxy terminated polybutadiene is added to styrene monomer. The balance of the experiments are conducted as described in connection with the procedure of Example 2. In both instances, polymers with improved flexibility are produced.

EXAMPLE 10

In another experiment, also employing the procedure of Example 2, a carboxy terminated polybutadiene/acrylonitrile copolymer is combined with an 80/20, weight basis, mixture of styrene and acrylonitrile. In this case, however, a commercial epoxy resin, marketed by Shell as EPON 828, is employed in conjunction with a triethyl amine catalyst, as a substitute for the MDI polyurethane system of Example 2. Again the polymers produced exhibit excellent flexibility.

EXAMPLE 11

In this experiment, the procedure of Example 2 is again employed, however, using a hydroxy terminated polybutadiene dissolved in an 80/20, by weight, mixture of styrene and acrylonitrile. The reaction employs dimethyl, dichloro silane and a triethyl amine catalyst to produce a siloxane polymer, rather than using the MDI system of Example 2 to produce a polyurethane. Again the polymer produced exhibits superior flexibility characteristics.

The polymer blends of the invention have a wide variety of applications not only by themselves, but as additives for other polymer systems. For example, the gel and/or the final polymer blend can be added to polyvinyl chloride by conventional compounding techniques, including the use of high-intensity mixers, mills, compounding extruders, or other equipment to produce a wide range of high-impact products. In cases where the gel of the first polymer is added directly, a concurrent, or post-compounding step to polymerize the monomer and produce the second polymer is required. The materials may also be used with other thermoplastics, however, such as acrylonitrile/butadiene/styrene terpolymers; styrene/acrylonitrile copolymers; polystyrene; polyolefins; poly(phenylene oxide) and others. The compounding of the blends with thermosetting systems such as polyesters, epoxys, phenolics, and the like, can also be useful.

While in accordance with the patent statutes, a preferred embodiment and best mode has been presented, the scope of the invention is not limited thereto, but rather is measured by the scope of the attached claims.

What is claimed is:

1. A polymer blend prepared by a process comprising:
    (1) preparing a reaction mixture that includes (a) at least two different compounds reactive with each other to form a first polymer without the use of a free radical polymerization mechanism; (b) at least one monomer containing carbon-to-carbon double bonds, said monomer being polymerizable to form a second polymer by a free radical polymerization mechanism; and (c) a reactive initiator containing a plurality of reactive functional groups;
    (2) reacting said two different compounds to form a mixture comprising said first polymer, and said monomer; and
    (3) thereafter polymerizing said monomer to form a second polymer, thereby forming a polymeric blend of said first and second polymers in which said polymers are connected to each other through their chemical interaction with said reactive initiator,
    wherein said first polymer is selected from a member of the group consisting of a polyurethane polymer and a polyepoxide polymer, and
    during the formation of said first polymer, a member selected from the group consisting of an isocyanate precursor of the polyurethane polymer and an epoxide precursor of the polyepoxide polymer reacts with said reactive initiator,
    said second polymer being formed by the in-situ free radical polymerization of a monomer member selected from the group consisting of methyl methacrylate, an acrylate, a mixture of styrene/acrylonitrile monomers, a mixture of styrene/butadiene monomers, a mixture of acrylate/acrylontrile monomers, vinyl chloride, a mixture of vinyl chloride/acrylate monomers, acrylonitrile, vinyl acetate and styrene,
    wherein said first polymer is formed as a gel containing said monomer member before formation of said second polymer, and both said first and said second polymers are bound to each other through chemical linkages generated by said reactive initiator,
    and wherein further, said reactive initiator is selected from the group consisting of peroxides with multiple functional groups selected from carboxyl functions and hydroxyl functions, and polyfunctional azo compounds.

2. A polymeric blend according to claim 1 wherein said reactive initiator is a compound containing an azo group that also contains a plurality of reactive functional groups.

3. A polymeric blend according to claim 1 wherein said reactive initiator is a member selected from the group consisting of 4,4'-Azobis (4-cyanopentanoic acid); 2,2'-Azobis {2-methyl-N-[1, 1-bis(hydroxymethyl)-2-hydroxy ethyl] propionamide}; 2,2'-Azobis {2-methyl-N-[1, 1-bis (hydroxymethyl) ethyl] propionamide}; and 2,2'-Azobis [2-methyl-N-(2-hydroxyethyl) propionamide].

4. A polymeric blend according to claim 1 wherein said first polymeric compound is an expoxide polymer interacted with said reactive initiator.

* * * * *